United States Patent
Heimendahl et al.

(10) Patent No.: US 11,892,152 B2
(45) Date of Patent: Feb. 6, 2024

(54) METHOD OF DETERMINING OPERATING CONDITIONS OF AN EXTERIOR AIRCRAFT LIGHT, EXTERIOR AIRCRAFT LIGHT, AND METHOD OF CALIBRATING AN EXTERIOR AIRCRAFT LIGHT

(71) Applicant: Goodrich Lighting Systems GmbH & Co. KG, Lippstadt (DE)

(72) Inventors: Andre Hessling-Von Heimendahl, Koblenz (DE); Anil Kumar Jha, Lippstadt (DE); Jens Leuschner, Moehnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 217 days.

(21) Appl. No.: 17/566,900

(22) Filed: Dec. 31, 2021

(65) Prior Publication Data

US 2022/0221141 A1 Jul. 14, 2022

(30) Foreign Application Priority Data

Jan. 8, 2021 (EP) .................................. 21150757

(51) Int. Cl.
*B64D 47/02* (2006.01)
*G01V 8/10* (2006.01)
(Continued)

(52) U.S. Cl.
CPC .......... *F21V 23/0464* (2013.01); *B64D 47/02* (2013.01); *F21V 23/003* (2013.01);
(Continued)

(58) Field of Classification Search
CPC ... F21V 23/0464; F21V 23/003; B64D 47/02; G01J 1/4204; G01K 3/005; G01V 8/10; F21W 2107/30
See application file for complete search history.

(56) References Cited

U.S. PATENT DOCUMENTS 8,579,480 B2 11/2013 Willeke et al.
8,773,044 B2 7/2014 Hessling
(Continued)

FOREIGN PATENT DOCUMENTS

EP 2995501 3/2016
EP 3073249 9/2016
(Continued)

OTHER PUBLICATIONS

USPTO; Non-Final Office Action dated Jun. 7, 2022 in U.S. Appl. No. 17/566,868.
(Continued)

*Primary Examiner* — Henry Luong
(74) *Attorney, Agent, or Firm* — SNELL & WILMER L.L.P.

(57) ABSTRACT

A method of determining operating conditions of an exterior aircraft light comprising at least one light source includes: operating the at least one light source of the exterior aircraft light; repeatedly detecting light with a light detector, which is located at the exterior aircraft light and configured for providing light detection values; determining a smallest light detection value ($I_{min}$) provided by the light detector within a first period of time, and storing said smallest light detection value ($I_{min}$) as an element of a series of smallest light detection values ($I_{min}$); and evaluating the light detection values and the series of smallest light detection values ($I_{min}$) for detecting erosion of an optical component of the exterior aircraft light, for detecting the presence of ambient light and/or for detecting the presence of fog and/or clouds in front of the exterior aircraft light.

15 Claims, 8 Drawing Sheets

(51) Int. Cl.
*F21V 23/04* (2006.01)
*F21V 23/00* (2015.01)
*G01J 1/42* (2006.01)
*G01K 3/00* (2006.01)
*F21W 107/30* (2018.01)

(52) U.S. Cl.
CPC ............ *G01J 1/4204* (2013.01); *G01K 3/005* (2013.01); *G01V 8/10* (2013.01); *F21W 2107/30* (2018.01)

(56) References Cited

U.S. PATENT DOCUMENTS

| | | | |
|---|---|---|---|
| 9,635,739 | B2 | 4/2017 | Schoen et al. |
| 10,253,466 | B2 | 4/2019 | Messiou et al. |
| 10,299,343 | B2 | 5/2019 | Klein et al. |
| 10,408,706 | B2 | 9/2019 | Larsen et al. |
| 10,513,349 | B2 | 12/2019 | Jha et al. |
| 2008/0137353 | A1 | 6/2008 | Larsen et al. |
| 2011/0198997 | A1 | 8/2011 | Curtis |
| 2016/0345401 | A1* | 11/2016 | Hessling-Von Heimendahl ......... H05B 45/12 |
| 2017/0355470 | A1 | 12/2017 | Keller et al. |
| 2018/0141677 | A1 | 5/2018 | Lapujade |
| 2018/0334264 | A1 | 11/2018 | Jha |
| 2019/0032879 | A1 | 1/2019 | Tsao |
| 2019/0124739 | A1 | 4/2019 | Spinivasamurthy et al. |
| 2019/0193868 | A1 | 6/2019 | Trinschek |

FOREIGN PATENT DOCUMENTS

| | | |
|---|---|---|
| EP | 3095641 | 11/2016 |
| EP | 3095709 | 11/2016 |

OTHER PUBLICATIONS

European Patent Office, Extended Search Report dated Jun. 11, 2021 in EP Serial No. 21150757.9.

USPTO; Notice of Allowance dated Sep. 16, 2022 in U.S. Appl. No. 17/566,868.

EPO, Extended Search Report dated Jun. 15, 2021 in EP Serial No. 21150758.7.

* cited by examiner

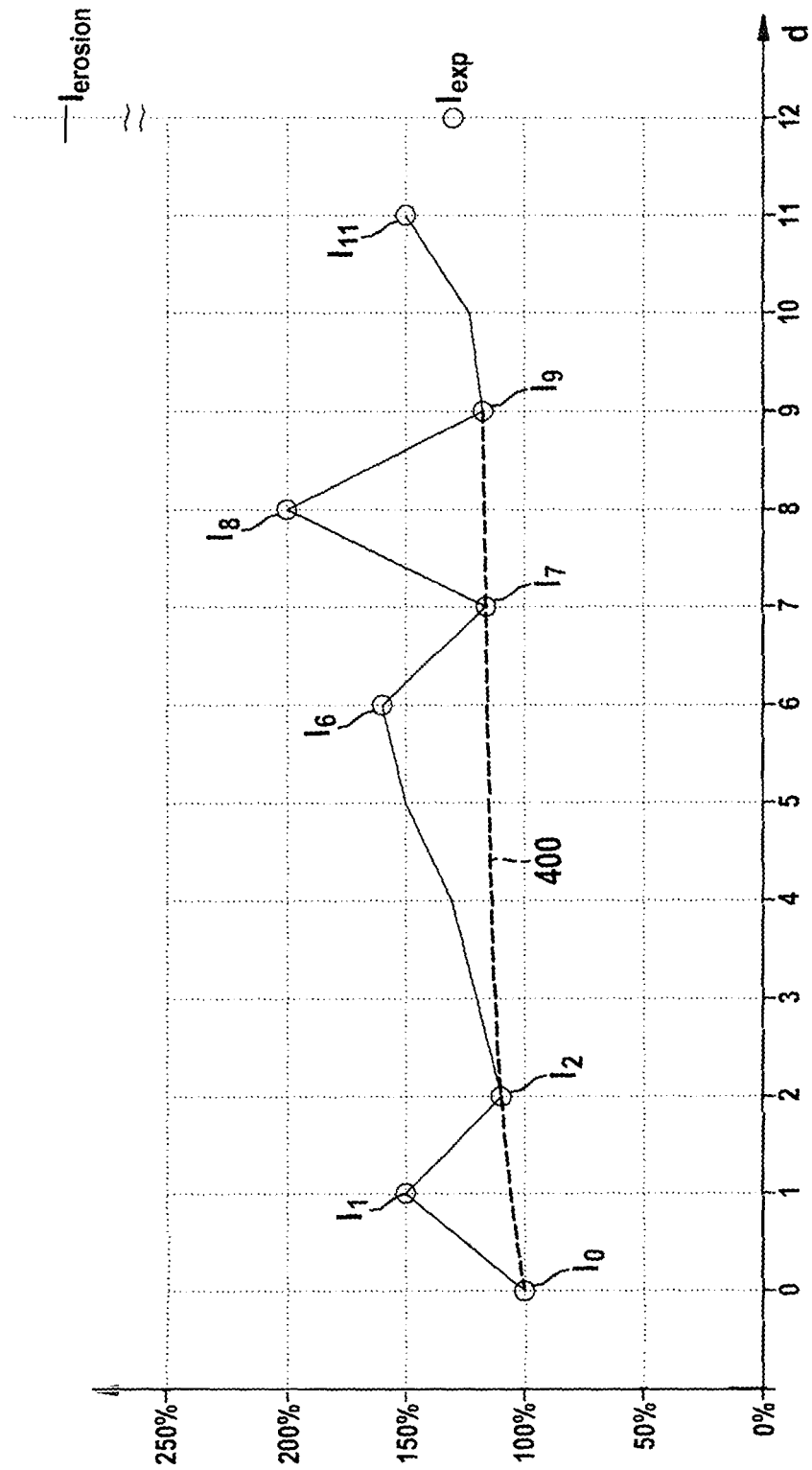

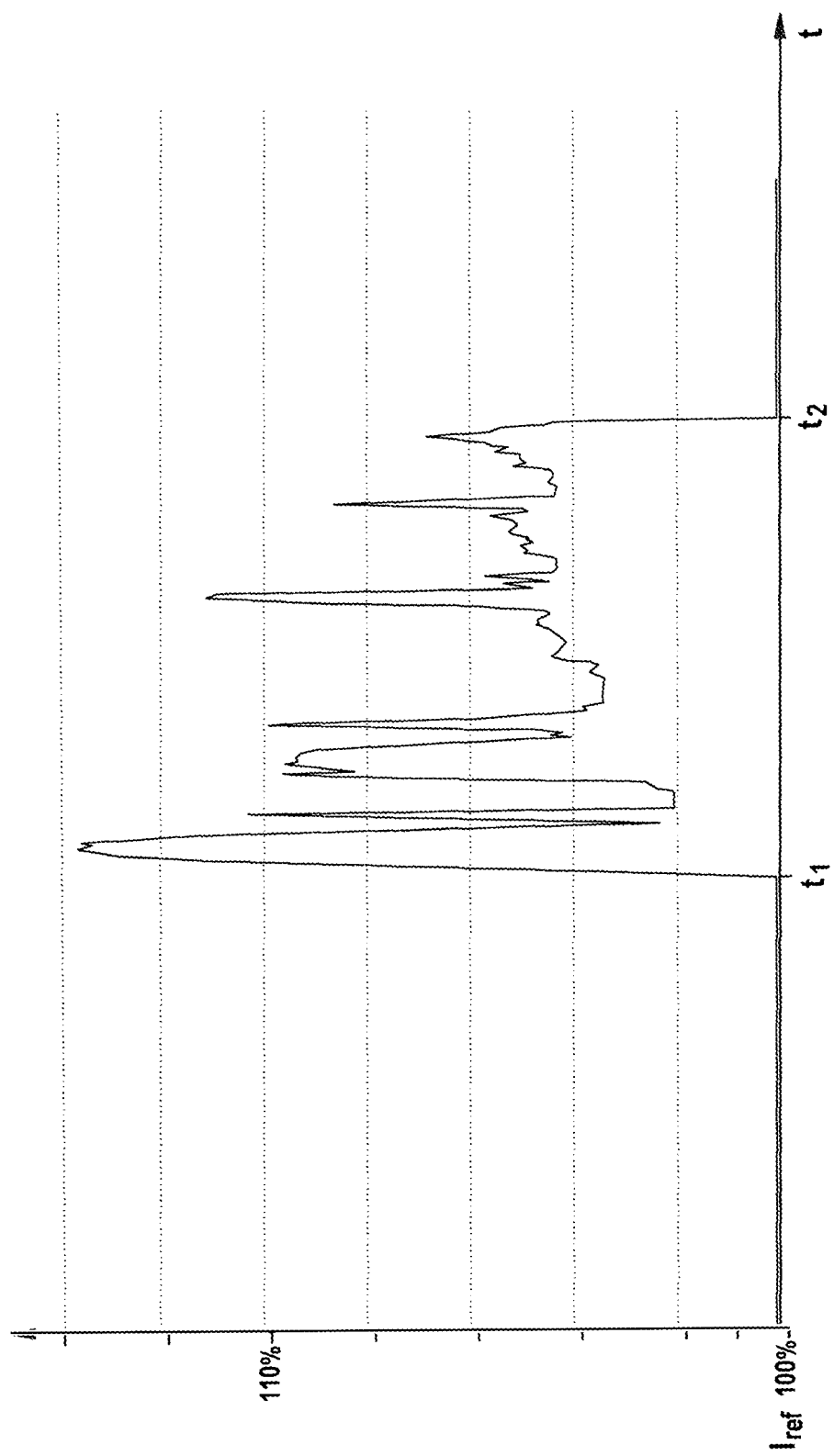

METHOD OF DETERMINING OPERATING CONDITIONS OF AN EXTERIOR AIRCRAFT LIGHT, EXTERIOR AIRCRAFT LIGHT, AND METHOD OF CALIBRATING AN EXTERIOR AIRCRAFT LIGHT

CROSS-REFERENCE TO RELATED APPLICATIONS

This application claims priority to, and the benefit of, European Patent Application No. 21150757.9, having DAS code 2CE7, filed Jan. 8, 2021 and titled "METHOD OF DETERMINING OPERATING CONDITIONS OF AN EXTERIOR AIRCRAFT LIGHT, EXTERIOR AIRCRAFT LIGHT, AND METHOD OF CALIBRATING AN EXTERIOR AIRCRAFT LIGHT," which application is incorporated herein by reference in its entirety for all purposes.

FIELD

The present invention is in the field of exterior aircraft lighting. In particular, the present invention is related to a method of determining operating conditions of an exterior aircraft light comprising at least one light source. The invention is further related to an exterior aircraft light, which is configured for executing a method of determining its operating conditions, and to an aircraft comprising such an exterior aircraft light.

BACKGROUND

Almost all aircraft are equipped with exterior aircraft lights. In particular, large passenger airplanes have a wide variety of exterior aircraft lights. Examples include take-off and/or landing lights, taxi lights, navigation lights and anti-collision lights. The operating conditions of an exterior aircraft light change. Changes may include a change of ambient light (day/night) as well as changing weather conditions, which may include clouds, fog, rain, snowfall etc. The operating conditions of an exterior aircraft light may also change due to erosion of components of the exterior aircraft light. Current exterior aircraft lights are not always satisfactory in terms of providing good visibility conditions for the pilot(s) under different operating conditions.

Accordingly, it would be beneficial to provide a method which allows for automatically determining the current operating conditions of an exterior aircraft light, i.e. determining the operating conditions of the exterior aircraft light without the need for human analysis and/or intervention.

SUMMARY

Exemplary embodiments of the invention include a method of determining the operating conditions of an exterior aircraft light comprising at least one light source, wherein the method includes: operating the at least one light source of the exterior aircraft light; repeatedly detecting light with a light detector, which is located at the exterior aircraft light and configured for providing light detection values; determining a smallest light detection value provided by the light detector within a first period of time, and storing said smallest light detection value as an element of a series of smallest light detection values.

The method according to exemplary embodiments of the invention further includes at least one of the following:
determining a change of the elements of the series of smallest light detection values over a second period of time, which is larger than the first period of time, and detecting erosion of an optical component, in particular a cover, of the exterior aircraft light based on the determined change of the elements of the series of smallest light detection values over the second period of time;
determining, based on the series of smallest light detection values, an expectation value for the light detection value, individually comparing the detected light detection values with said expectation value, and detecting the presence of ambient light if at least one of the detected light detection values exceeds the expectation value by more than a predetermined ambient light detection threshold; and
determining a temporal fluctuation of the detected light detection values and detecting the presence of fog and/or clouds in front of the exterior aircraft light if the temporal fluctuation exceeds a predetermined fluctuation threshold.

Exemplary embodiments of the invention further include an exterior aircraft light comprising at least one light source; a light detector located at the exterior aircraft light and configured for providing light detection values; and a controller, which is configured for determining the smallest light detection value detected within a first period of time and storing said smallest light detection value as an element of a series of smallest light detection values. The controller is further configured for executing at least one of the following:
determining a change of the elements of the series of smallest light detection values over a second period of time, which is larger than the first period of time, and detecting erosion of an optical component, in particular a cover, of the exterior aircraft light based on the determined change of the elements of the series of smallest light detection values over the second period of time;
determining, based on the series of smallest light detection values, an expectation value for the light detection value, individually comparing the detected light detection values with said expectation value, and detecting the presence of ambient light if at least one of the detected light detection values exceeds the expectation value by more than a predetermined ambient light detection threshold; and
determining a temporal fluctuation of the detected light detection values and detecting the presence of fog and/or clouds if the temporal fluctuation exceeds a predetermined fluctuation threshold.

Exemplary embodiments of the invention further include an aircraft comprising at least one exterior aircraft light according to an exemplary embodiment of the invention.

Exemplary embodiments of the invention allow for reliably determining the current operating conditions of an exterior aircraft light. The operating conditions that can be determined may in particular include erosion of an optical component, such as a light transmissive cover of the exterior aircraft light, reflections caused by fog and/or clouds in front of the exterior aircraft light, and the presence of ambient light. Exemplary embodiments of the invention may also allow for distinguishing between different influences that may be detrimental to the effectiveness of the exterior aircraft light, such as distinguishing between erosion, presence of fog and/or clouds, and presence of ambient light.

Determining the current operating conditions may allow for automatically controlling the light output, emitted by the exterior aircraft light, in accordance with the current operating conditions, in order to achieve very good visibility conditions for the pilot(s) of the aircraft without human intervention. In particular, determining the current operating conditions may allow for detecting erosion of an optical component of the exterior aircraft light and replacing said optical component, before the erosion results in an unacceptable deterioration of the illumination capabilities of the exterior aircraft light. Potentially unsafe operating conditions of the aircraft may thus be avoided. As a result, the safety of the aircraft can be considerably enhanced.

By evaluating the light detection values in shorter first periods of time and evaluating a trend of the smallest light detection values in a longer second period of time, the determining of the operating conditions may be carried out in a particularly error-proof manner. By picking the smallest light detection value in the first period of time, temporary artifacts in light detection, such as rain drops on the cover of the exterior aircraft light, spikes in ambient light, etc., may be filtered out and a substantially true measure for the erosion of the optical component may be determined. Said true measure for the erosion of the optical component may be used as the expectation value for the light detection under eroded conditions and may therefore allow for a substantially true measure of ambient light. The concentration on the smallest light detection value in the first periods of time may allow for a reliable distinction between the erosion of the optical component and presence of ambient light.

In an embodiment, the first period of time is in the range of 8 hours to 48 hours, in particular between 16 hours and 32 hours, further in particular about 24 hours, i.e. 1 day. The second period of time may include a plurality of the first periods of time. The second period of time may in particular include 3 to 14, more particularly 5 to 7, of the first periods of time. Such first and second periods of time haven been found as beneficial for determining the current operating conditions of an exterior aircraft light, in particular for reliably detecting erosion of an optical component of the exterior aircraft light, without causing an unacceptable rate of false alarms.

In an embodiment, determining a temporal fluctuation of the detected light detection values includes determining whether the detected light detection values contain a sudden increase, such as an increase of at least 10% within a first time frame of 1 s, and/or whether the detected light detection values contain a continuing fluctuation, such as a change of at least 5% within each of a series of second time frames of 5 s. The series of second time frames may be a series of more than 3 second time frames, in particular more than 5 second time frames, further in particular between 5 and 20 second time frames. These parameters have been found as well suited for reliably detecting the presence of fog and/or clouds in front of the exterior aircraft light, without causing an unacceptable rate of false alarms. In particular, both the sudden increase and the continuing fluctuation have been found to be good indicators for the presence of fog and/or clouds. With the visibility situation depending on multiple variables, such as the density of the fog and/or clouds and the distance of the aircraft to the fog and/or clouds, it has been found that the sudden increase criterion and the continuing fluctuation criterion may complement each other well.

In an embodiment, the method further includes dimming the at least one light source if the presence of fog and/or clouds and/or the presence of ambient light has been detected. In this way, the risk of glaring the pilot(s) of the aircraft due to back-scatter of light at the fog and/or cloud particles may be reduced and/or an unnecessary/ineffective emission of light in broad daylight conditions may be prevented.

In an embodiment, the method includes determining an ambient temperature of the exterior aircraft light and the method further includes executing the steps of determining a temporal fluctuation of the detected light detection values and detecting the presence of fog and/or clouds only if the determined ambient temperature is below a predetermined temperature threshold, in particular below a predetermined temperature threshold of 25° C. At ambient temperatures above 25° C., neither fog nor clouds are to be expected. Analyzing the detected light detection values for the presence of fog and/or clouds can be deactivated, in order so save resources and to reduce the risk of an erroneous detection of fog and/or clouds.

In an embodiment, detecting erosion of the optical component includes relating the elements of the series of smallest light detection values to an initial reference value. The initial reference value can in particular have been determined for an exterior aircraft light, comprising an uneroded optical component, in particular an uneroded cover, and being placed in a dark environment with neither ambient light nor fog nor clouds being present. Relating the elements of the series of smallest light detection values to an initial reference value may provide for a method for detecting erosion of the exterior aircraft light which is easy to implement. The step of determining a change of the elements of the series of smallest light detection values may for example be embodied as observing an increase of the smallest light detection values, related to the initial reference value. For example, the smallest light detection values may increase from 100% of the initial reference value at the beginning of the operating life of the exterior aircraft light to values of 110%, 120%, etc. of the initial reference value. This change of the elements of the series of smallest light detection values may be used for a prediction of the end of the operating life of the optical component or may be used for a yes/no indication about the end of the operating life of the optical component on the basis of a threshold being reached or not or may be used for a combination of such metrics.

In an embodiment, the method further includes providing an erosion indication signal if the detected erosion exceeds a predetermined erosion threshold. The erosion indication signal may be provided, in order to notify the pilot and/or maintenance personnel that the erosion of the optical component has reached a level which requires maintenance, in particular replacement, of the eroded optical component, in order to ensure safe operation of the aircraft.

Exemplary embodiments of the invention further include a method of calibrating an exterior aircraft light according to an embodiment of the invention, wherein the method comprises:
  placing an exterior aircraft light comprising an uneroded optical component, in particular an uneroded cover, in a dark environment with neither ambient light nor fog nor clouds being present;
  operating the at least one light source;
  detecting light with the light detector and providing an initial reference value; and
  storing the initial reference value.

Exemplary embodiments of the invention also include a method of calibrating an exterior aircraft light according an exemplary embodiment of the invention, wherein the method further includes:
  placing a white screen in front of the exterior aircraft light;

detecting light, which is reflected by the white screen towards the exterior aircraft light, with the light detector and providing a fog reference light detection value; and storing the fog reference light detection value.

Such a method provides a reliable method of determining and storing a fog reference light detection value, which is simple to implement and which may be performed in the factory or a laboratory without mounting the exterior aircraft light to an aircraft and without the need of fog being present.

Exemplary embodiments of the invention also include a method of calibrating an exterior aircraft light according to an embodiment of the invention, wherein the method further includes placing a diffuse item, in particular an adhesive tape, in front of a light emission surface of the exterior aircraft light;

detecting light, which is reflected by the diffuse item towards the exterior aircraft light, with the light detector and providing a predetermined erosion threshold; and storing the predetermined erosion threshold.

Such a method provides a reliable method of determining and storing a erosion reference light detection value, which is simple to implement and which may be performed in the factory or a laboratory without mounting the exterior aircraft light to an aircraft and without the need of eroding the exterior aircraft light.

Exemplary embodiments of the invention further include transferring reference light detection values, which have been determined for an exterior aircraft light to at least one other exterior aircraft light, which is structurally identical. Transferring reference light detection values, which have been determined for another, structurally identical exterior aircraft light, avoids the need for individually determining the reference light detection values for every exterior aircraft light from a series of structurally identical exterior aircraft lights.

BRIEF DESCRIPTION OF THE DRAWINGS

In the following, further exemplary embodiments of the invention will be described with respect to the accompanying drawings, wherein:

FIG. 5 illustrates an example of the change of detected light detection values over time, caused by erosion.

FIG. 6 illustrates an example of the change of detected light detection values over time, caused by fog.

FIG. 1A is a schematic top view of an aircraft 100, comprising a fuselage 102 and two wings 104, 106, laterally extending from the fuselage 102. FIG. 1B shows a schematic side view of the aircraft 100. The aircraft 100 may for example be a passenger airplane, in particular a large commercial passenger airplane.

DETAILED DESCRIPTION

Figure 1A:
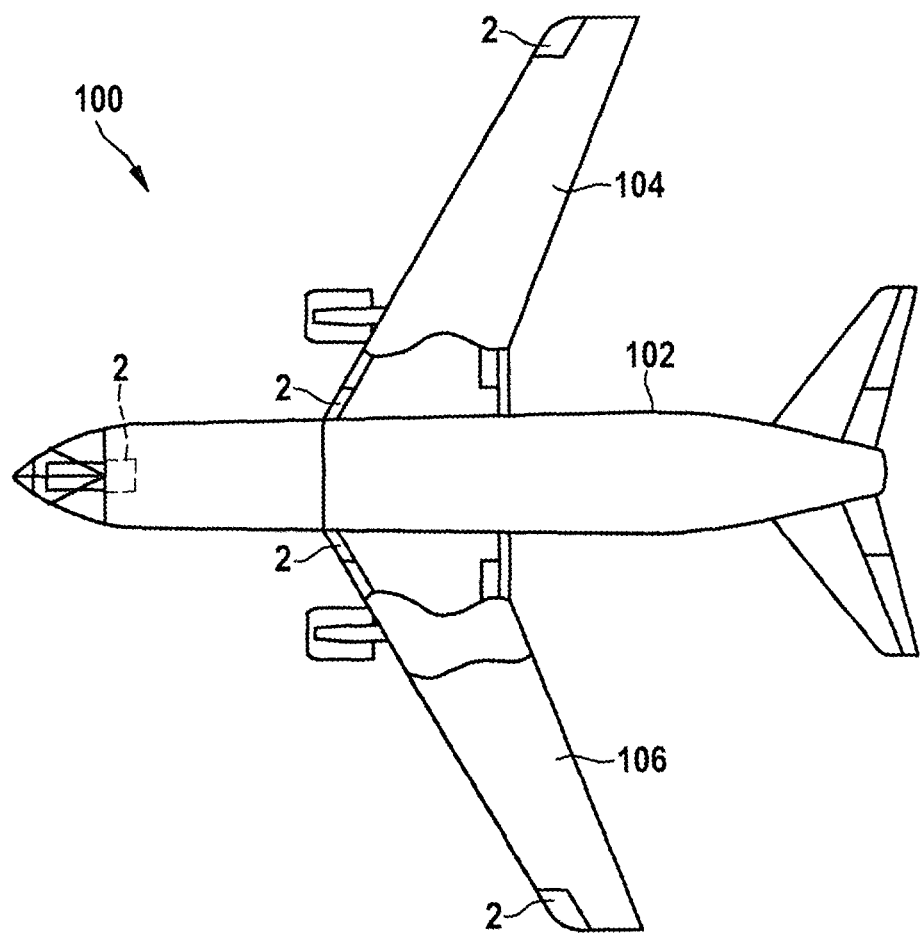
FIG. 1A is a schematic top view of an aircraft comprising at least one exterior aircraft light according to an embodiment of the invention.

The aircraft 100 comprises a plurality of exterior aircraft lights 2. Only an exemplary selection of such exterior aircraft lights 2 is depicted in FIGS. 1A and 1B, and the skilled person understands that an aircraft 100 may comprise additional or alternative exterior aircraft lights 2.

Figure 1B:
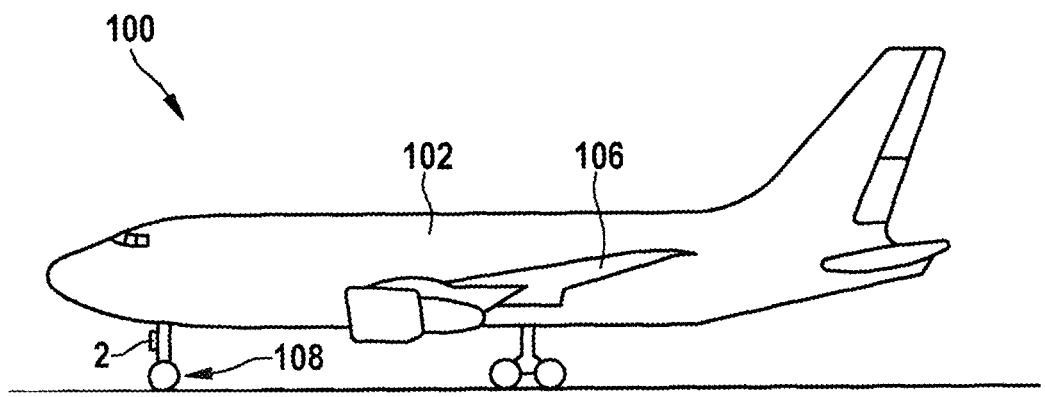
FIG. 1B shows a schematic side view of the aircraft depicted in FIG. 1A.

An exterior aircraft light 2 may, for example, be mounted to a front gear 108 of the aircraft 100, as depicted in FIG. 1B. Exterior aircraft lights 2 also may be mounted to the roots and/or to the tips of the wings 104, 106 of the aircraft 100, as shown in FIG. 1A.

The exterior aircraft lights 2 may in particular include landing lights and/or take-off lights, which are activated during landing and/or take-off of the aircraft 100, respectively. The exterior aircraft lights 2 may further include taxi lights and/or runway turn-off flights, which are configured for illuminating the ground when the aircraft 100 is taxiing on the ground. The exterior aircraft lights 2 may also include navigation lights and anti-collision lights, which are configured for indicating the position of the aircraft 100.

Figure 2A:
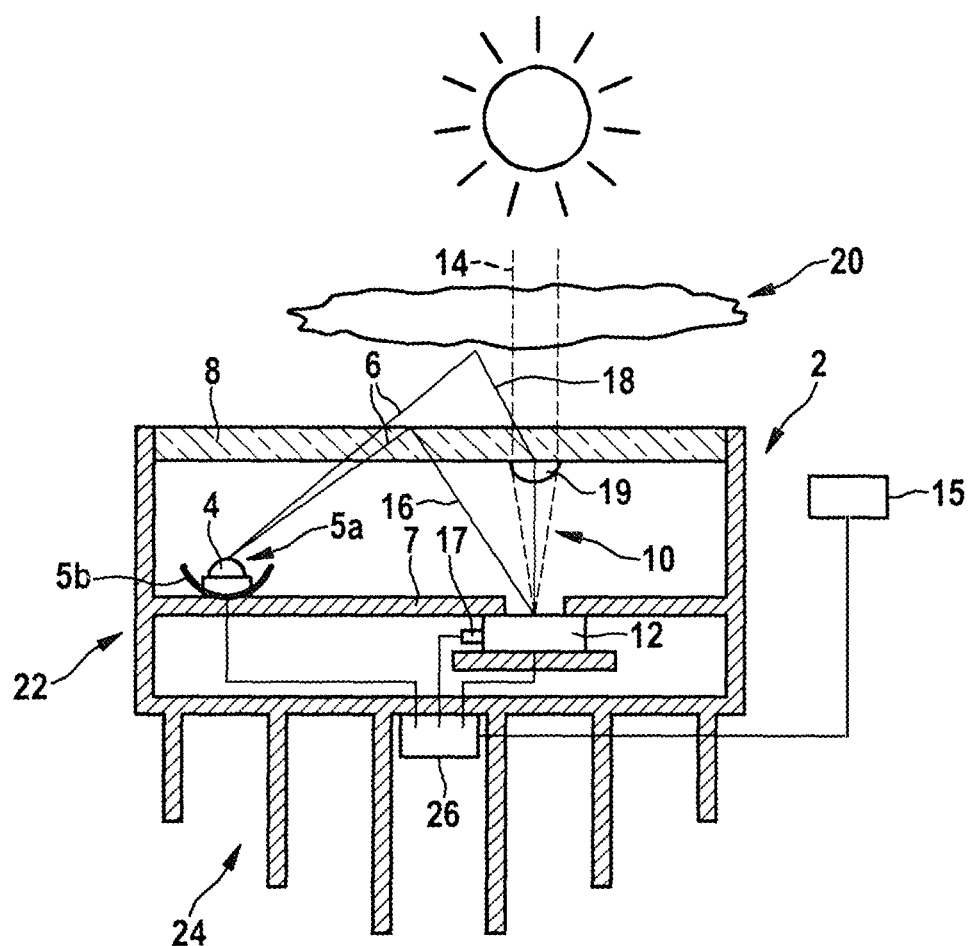
FIGS. 2A to 2C depict schematic cross-sectional views through an exterior aircraft light according to an exemplary embodiment of the invention.
Figure 2B:
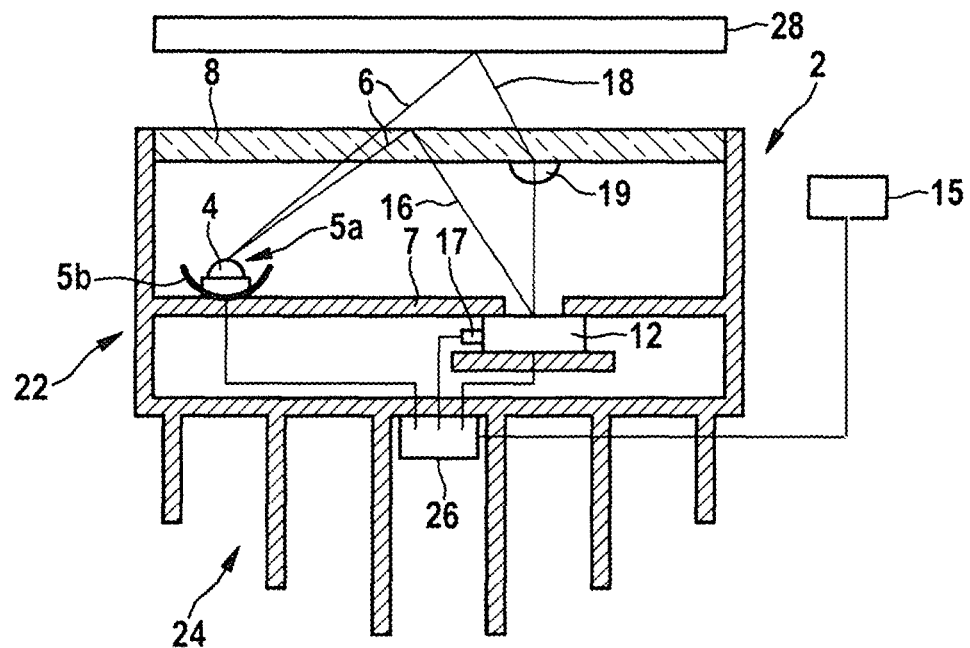
Figure 2C:
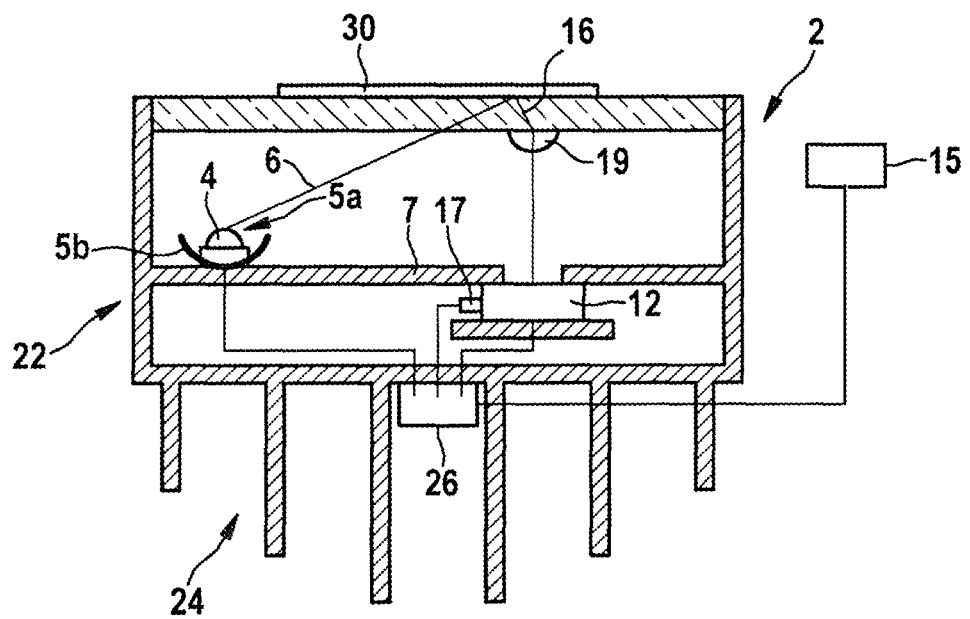

FIGS. 2A to 2C depict schematic cross-sectional views through an exterior aircraft light 2 according to an exemplary embodiment of the invention.

The exterior aircraft light 2 comprises at least one light source 4, for example an LED. The at least one light source 4, potentially in combination with an optical system, are arranged for providing the light output of the exterior aircraft light 2. Out of the light output, which is generally an extensive light output over a desired angular range, only two exemplary light rays 6 are depicted. Those two exemplary light rays 6 are depicted for illustrating the function of determining the operating conditions of the exterior aircraft light 2.

The exterior aircraft light 2 further comprises an at least partially light transmissive cover 8, which covers the at least one lights source 4 and protects the at least one lights source 4 from adverse exterior influences, such as water, moisture, dust, dirt etc. The at least partially light transmissive cover 8 further protects the at least one lights source 4 from mechanical impact.

The at least partially light transmissive cover 8 is considered an optical component, as the light output of the exterior aircraft light 2 travels therethrough. The at least partially light transmissive cover 8 may have no or substantially no effect on the light output. For example, the at least partially light transmissive cover 8 may simply pass the light from the at least one light source 4 therethough. It is also possible that the at least partially light transmissive cover 8 may be an optically active component, such as a lens, which may for example be configured for shaping, in particular focusing, the light emitted by the at least one light source 4 into a light beam having a desired shape.

Alternatively or additionally, the exterior aircraft light 2 may be equipped with at least one lens 5a, which is arranged between the at least one light source 4 and the at least partially light transmissive cover 8, and/or the exterior aircraft light 2 may be equipped with a reflector 5b, which is configured for reflecting light emitted by the at least one light source 4 into desired directions.

The exterior aircraft light 2 further comprises a light detector 12, which is configured for detecting incoming and/or reflected light.

A blind 7 is configured to block any direct light path between the at least one light source 4 and the light detector 12, in order to prevent the light, emitted from the at least one light source 4, from directly radiating onto the light detector 12.

The light detected by the light detector 12 may include incoming light 14, in particular ambient light (sunlight) 14, radiating into the exterior aircraft light 2. The light detected by the light detector 12 may further include light, emitted by the at least one light source 4, which is reflected by the at least partially light transmissive cover 8. An exemplary light ray of such reflected light is denoted with reference numeral 16. The light detected by the light detector 12 may further include light, emitted by the at least one light source 4, which is reflected by fog or clouds 20 in front of the exterior aircraft light 2, as illustrated in FIG. 2A. An exemplary light ray of such reflected light is denoted with reference numeral 18.

The exterior aircraft light 2 may include a light detector lens 19, which is configured for focusing the incoming light 14 onto the light detector 12, in particular focusing the incoming light 14 into a converging beam 10 of light.

The exterior aircraft light 2 further comprises a housing 22, which may be equipped with cooling fins 24 for dissipating heat, generated when operating the at least one light source 4.

The exterior aircraft light 2 also comprises a controller 26, which is electrically connected to the light detector 12 and to the at least one light source 4. The controller 26 is configured for receiving, from the light detector 12, light detection values indicating the amount of light detected by the light detector 12. The controller 26 is further configured for controlling the operation of the at least one light source 4, based on the received light detection values.

The controller 26 is further electrically connected to an ambient temperature sensor 15, which is configured for detecting an ambient temperature $T_{amb}$, i.e. a temperature of the environment outside the exterior aircraft light 2 and outside the aircraft 100. The ambient temperature sensor 15 may be located in some spatial distance from the exterior aircraft light 2, in order to avoid that the ambient temperature $T_{amb}$, detected by temperature sensor 15, is affected by heat generated by the at least one light source 4.

The exterior aircraft light 2 may further include an internal temperature sensor 17, which is located inside the exterior aircraft light 2, in particular close to the light detector 12, and which is configured for detecting the temperature at the light detector 12.

Figure 3A:
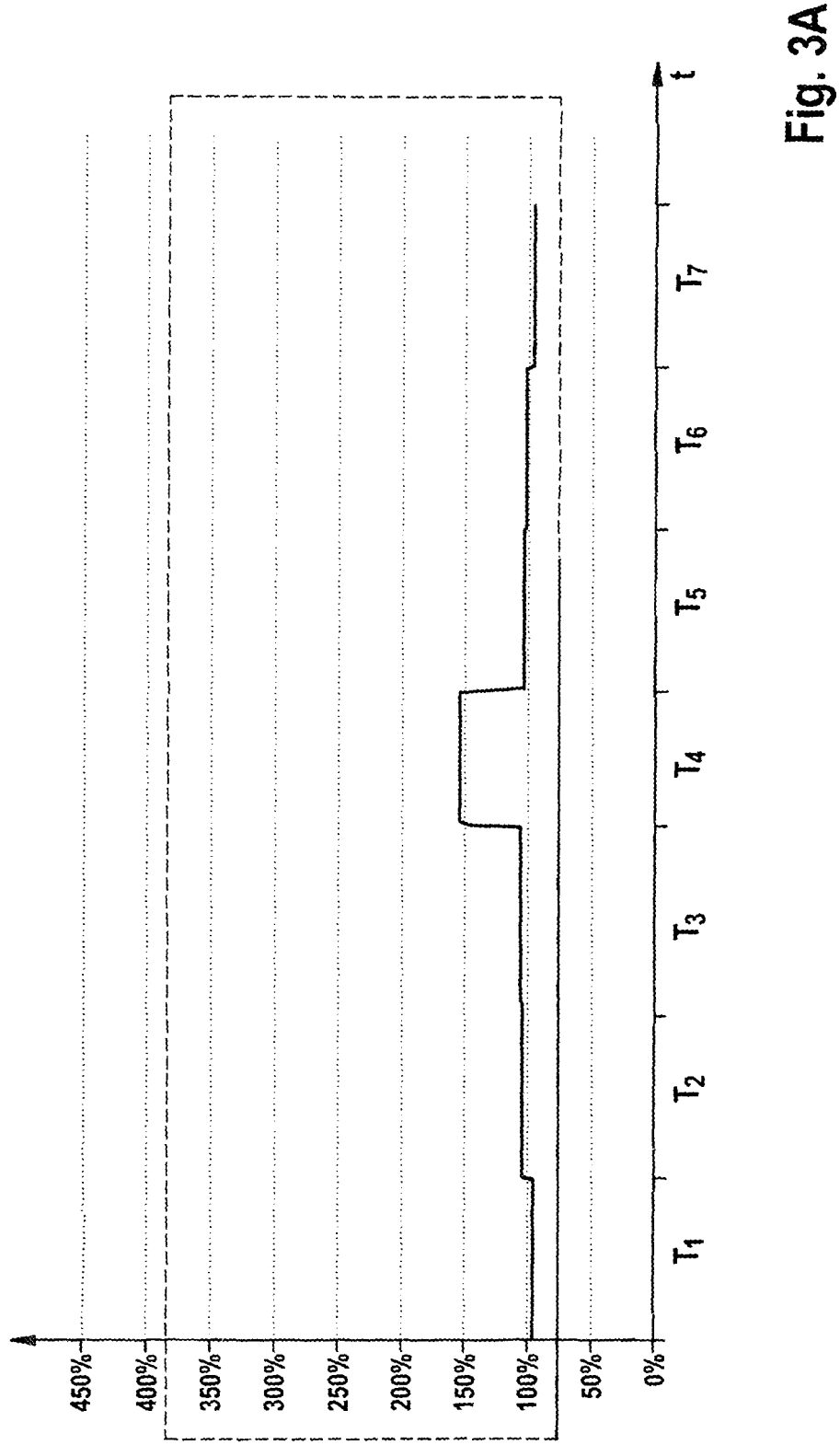
FIG. 3A depicts a diagram illustrating light detection values corresponding to different operating conditions of an exterior aircraft light.
Figure 3B:
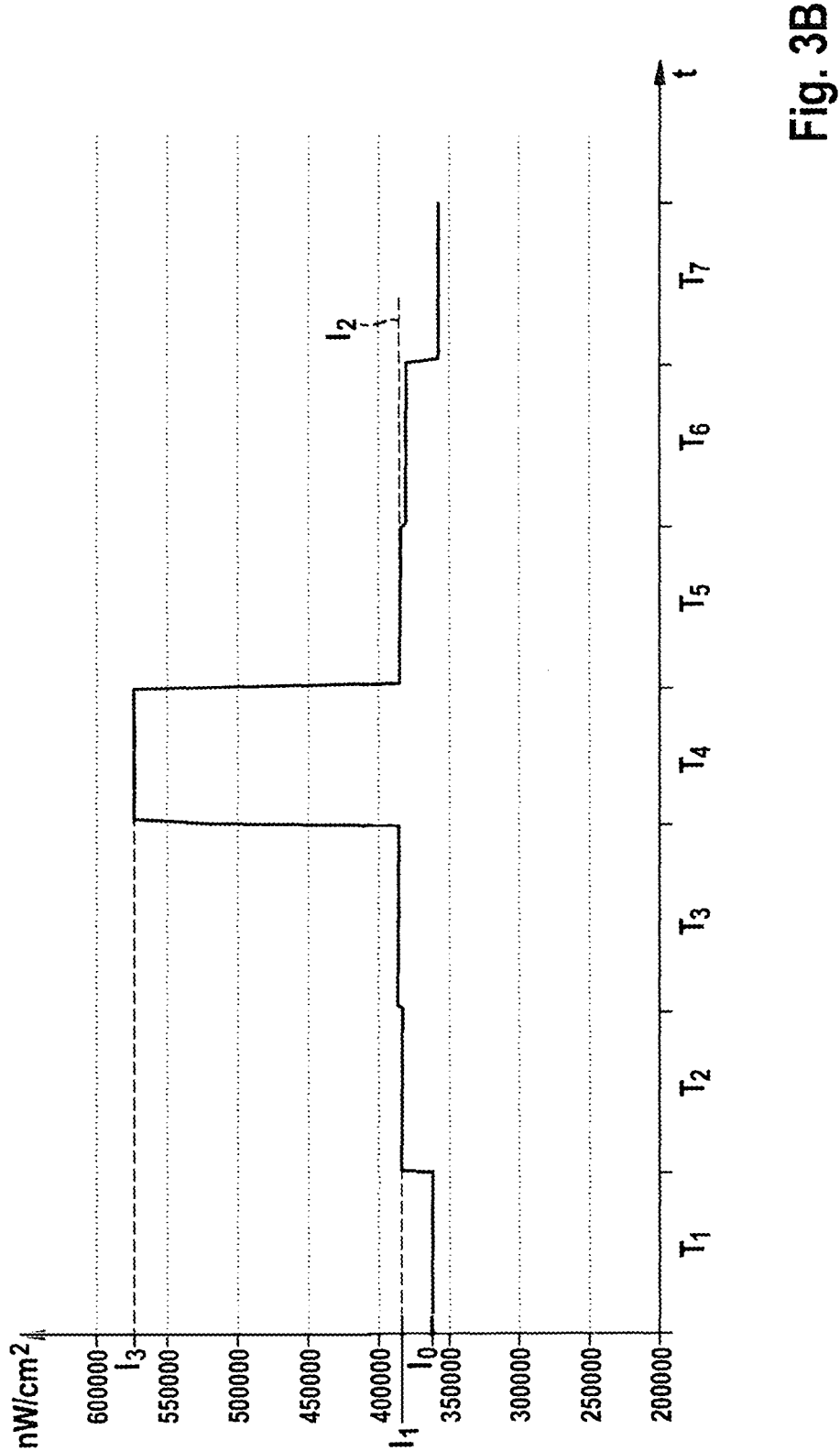
FIG. 3B depicts an enlarged cut-out of the diagram shown in FIG. 3A.

FIGS. 3A and 3B show diagrams illustrating the change of the light detection values I, supplied from the light detector 12 to the controller 26, due to changes of the operating conditions of the exterior aircraft light 2. In the diagrams depicted in FIGS. 3A and 3B, the light detection values I are plotted on the vertical axis over time, which is plotted on the horizontal axis. FIG. 3B depicts an enlarged cut-out of the diagram shown in FIG. 3A.

Seven time frames $T_1$-$T_7$, corresponding to different operating conditions, which result in different light detection values I, are shown in FIGS. 3A and 3B.

In the first and seventh time frames $T_1$, $T_7$, the at least one light source 4 of the exterior aircraft light 2 is activated, and the light detection values I, supplied from the light detector 12 to the controller 26, result from a portion of light which is reflected by the at least partially light transmissive cover 8 towards the light detector 12 (cf. FIG. 2A). These light detection values I correspond to normal operating conditions of the exterior aircraft light 2 at the beginning of its service life and are thus set as an initial reference value $I_0$ (100%).

In the second and sixth time frames $T_2$, $T_6$, fog or clouds 20 are present in a region in front of the exterior aircraft light 2 (see FIG. 2A). Under laboratory conditions, e.g in the factory, fog and/or clouds 20 can be simulated by arranging a white board or screen 28 in front of the exterior aircraft light 2 (see FIG. 2B), causing a diffuse reflection of light, emitted by the exterior aircraft light 2 towards the light detector 12, which is similar to the reflection of light caused by fog and/or clouds 20.

The diffuse reflection caused by fog or clouds 20 or a white screen 28 causes the light detection values $I_1$ to increase, as compared to the light detection values $I_0$ detected in normal operation ($I_1 > I_0$).

During the third and fifth time frames $T_3$, $T_5$, ambient light 14 is present and detected by the light detector 12. The detection of ambient light 14 results in ambient light detection values $I_2$, which may be larger than the light detection values $I_1$, caused by the fog or clouds 20 ($I_2 > I_1$). However, as clearly visible from FIGS. 3A and 3B, the difference $\Delta_2 = I_2 - I_1$ between these light detection values is considerably smaller than the difference $\Delta_1 = I_1 - I_0$ between the light detection values $I_1$, caused by fog or clouds 20, and the initial reference value $I_0$ detected during normal operation: $\Delta_1 \gg \Delta_2$.

Finally, during a fourth time frame $T_4$, additional light, which is reflected due to erosion of the at least partially light transmissive cover 8, is detected by the light detector 12. Erosion of the cover 8 results in the formation of small damaged spots and/or scratches within the cover 8, causing additional reflection of incident light 6 at the cover 8. This additional reflection results in considerably higher light detection values $I_3$, as illustrated in FIGS. 3A and 3B.

Under laboratory conditions, erosion of the at least partially light transmissive cover 8 may be simulated by attaching a partially light transmissive tape 30, in particular a tape 30 having diffusely transmissive properties, to the at least partially light transmissive cover 8, which causes the additional reflection of incident light 6 (see FIG. 2C).

The influence of the operating conditions on the light detection values, supplied by the light detector 12 to the controller 26, which is exemplarily depicted in FIGS. 3A and 3B, may allow for evaluating and determining the current operating conditions of the exterior aircraft light 2 from said light detection values $I_1$, $I_2$, $I_3$.

Figure 4:
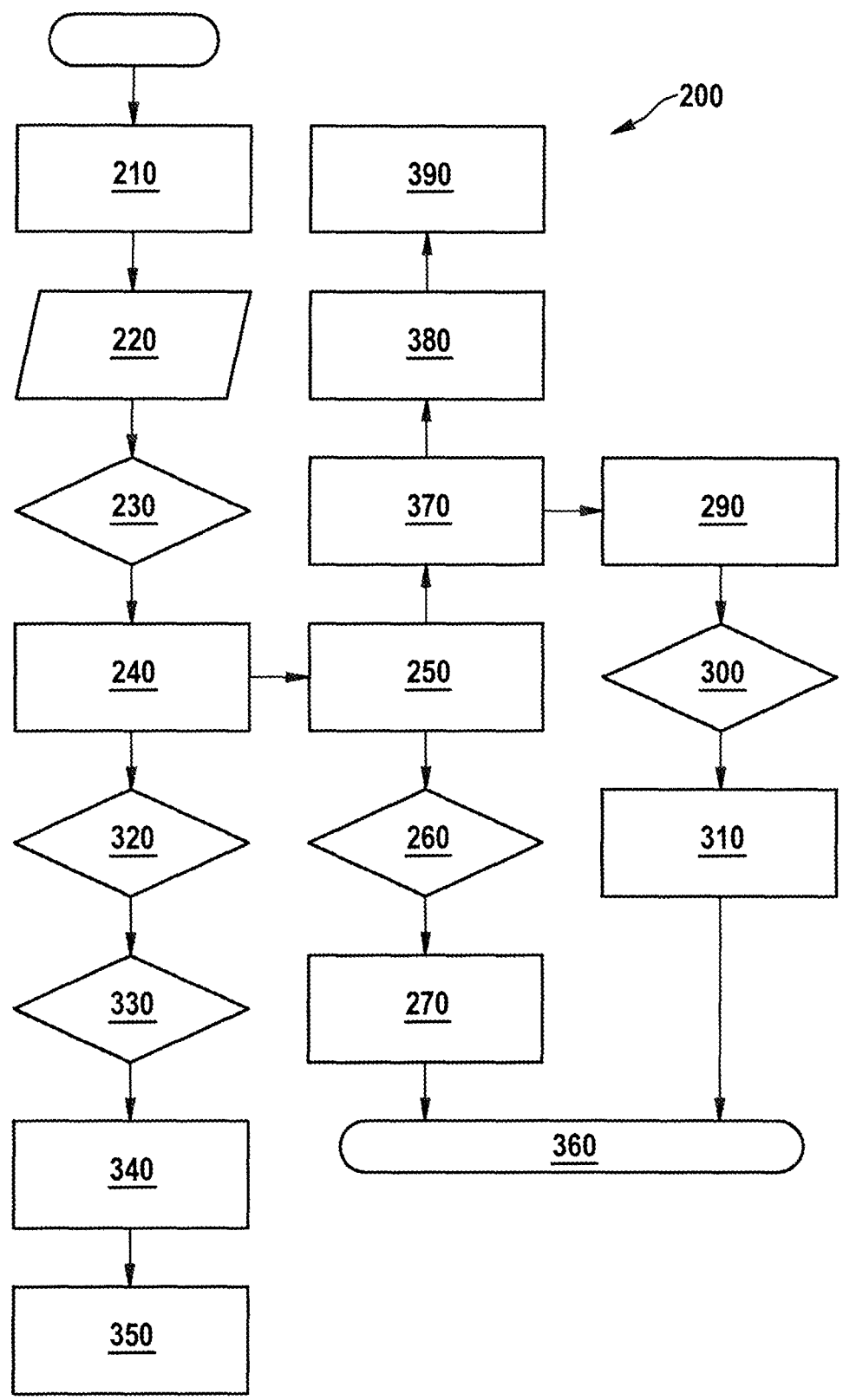
FIG. 4 is a flow chart illustrating an exemplary embodiment of a method of determining the operating conditions of the exterior aircraft light according to an exemplary embodiment of the invention.

In the following, an exemplary embodiment of a method 200 of determining the operating conditions of the exterior aircraft light 2 is discussed with reference to the flow chart depicted in FIG. 4.

In a first (calibration) step 210, reference values $I^{ref}_0$, $I^{ref}_1$, $I^{ref}_2$, $I^{ref}_3$ for the light detection values $I_0$, $I_1$, $I_2$, $I_3$, associated with different operating conditions, including normal operation, operation in a foggy environment, operation with ambient light being present, and operation with an eroded cover are determined. These reference values $I^{ref}_0$, $I^{ref}_1$, $I^{ref}_2$, $I^{ref}_3$ may be determined under laboratory conditions, before the exterior aircraft light 2 is mounted to an aircraft 100, as it has been described before.

This calibration step 210 needs to be performed only once during the lifetime of the exterior aircraft light 2. It is also possible that the calibration step 210 is performed only once for a plurality of structurally identical exterior aircraft lights 2, with the determined reference values $I^{ref}_0$, $I^{ref}_1$, $I^{ref}_2$, $I^{ref}_3$ being applied to/supplied to all structurally identical exterior aircraft lights 2.

When the exterior aircraft light 2 is operated, light detection values I from the light detector 12 and temperature detection values from temperature sensors 15, 17 are supplied to the controller 26 (step 220).

In the next step 230, it is checked whether the latest detected light detection value I is in a predefined range, e.g. in a range of 70% to 400% (cf. FIG. 3B) of the light detection value $I^{ref}_0$, corresponding to normal operation (100%). If the detected light detection value I is outside said predefined range, a malfunction is assumed and the detected light detection value I is ignored.

Then (in step 240), any deviations of the detected light detection value I, which may result from a temperature dependence of the light detector 12, are compensated based on the temperature detected by the internal temperature sensor 17. The temperature characteristics of the light detector 12 may be stored within the controller 26, e.g. in the form of a table or a mathematical formula, in order to allow the controller 26 to compensate for the temperature dependence of the light detection values I.

In a next step 250, the smallest light detection value $I_{min}$ within a predetermined time frame, e.g. within a time frame of one day (24 hours), is determined. In other words, the latest detected light detection value $I_{latest}$ is compared with a previously stored smallest light detection value $I_{min}$, and the previously stored smallest light detection value $I_{min}$ is replaced by the latest detected light detection value ($I_{min}=I_{latest}$) if said latest detected light detection value $I_{latest}$ is smaller than the previously stored smallest light detection value $I_{min}$.

The smallest light detection values $I_{min}$ of each day are stored within the controller 26 as series of smallest light detection values $I_{min}$.

If the detected light detection value I is smaller than a predetermined reference value $I_{ref-wet}$ (step 260), the cover 8 of the exterior aircraft light 2 is considered as wet (step 270). In this case, no further analysis is performed and the method is terminated (step 360), until a new light detection value I has been received. The predetermined reference value $I_{ref-wet}$ may be the smallest light detection value $I_{min}$ of the latest predetermined time frame that is considered reliable or may be the expectation value discussed below with reference to FIG. 5 or any other suitable reference value that allows for deriving the presence of water drops/droplets on the cover 8.

In case the detected light detection value I is larger than the predetermined reference value $I_{ref-wet}$, so that the cover 8 of the exterior aircraft light 2 is not considered as wet, the change of the elements of the stored series of smallest light detection values $I_{min}$ over a second period of time, which is larger than the first period of time, is determined (step 370). The second period of time usually extends over a couple of days, for example over 3 to 14 days, in particular over 5 to 7 days.

Erosion of the cover 8 of the exterior aircraft light 2 is then determined from the determined change of the elements of the series of smallest light detection values $I_{min}$ during the second period of time (step 380).

Erosion, for example, may be detected if at least one of the series of smallest light detection values $I_{min}$ exceeds a predetermined erosion threshold $I_{erosion}$ ($I_{min}>I_{erosion}$).

If erosion of the cover 8 has been detected, an erosion indication signal, indicating the need for maintenance of the exterior aircraft light 2, in particular the need for replacing the eroded cover 8, is issued in step 390.

An example of the development of the smallest light detection values $I_{min}$ during the second time frame is illustrated in the diagram depicted in FIG. 5. In said diagram, the smallest light detection values $I_0$ to $I_7$ of each day are plotted on the vertical axis as a function of time, in particular as a function of the number of days d, which is plotted on the horizontal axis. Selected ones of the smallest light detection values $I_{min}$, namely the smallest light detection values of the first, second, sixth, seventh, eighth, ninth, and eleventh day, denoted as $I_1$, $I_2$, $I_6$, $I_7$, $I_8$, $I_9$, and $I_{11}$, are illustrated via circular markings.

The smallest light detection value $I_0$ of day 0 is the initial reference value $I_0=100\%$.

FIG. 5 shows that the day-by-day smallest light detection values fluctuate. On each day d, the smallest light detection value, detected at this day d, may be larger or smaller than the smallest light detection value of the previous day.

Erosion of the cover 8, however, causes the curve of smallest light detection value to generally increase; it in particular causes the minima of the smallest light detection values to gradually increase over time, as it is indicated by the curve 400, which is plotted as a dashed line in FIG. 5.

In order to avoid an erroneous detection of erosion due to temporarily increased light detection values, such as the light detection values $I_1$, $I_6$, $I_8$ and $I_{11}$, depicted in FIG. 5, only the minima of the course of smallest light detection values are considered for detecting erosion. In the exemplary situation of FIG. 5, only $I_2$, $I_7$, and $I_9$ of the series of fluctuating smallest light detection values are considered for detecting erosion.

For example, erosion may be detected (only) if the curve 400 extending through the minima of the smallest light detection values, i.e. through $I_2$, $I_7$, and $I_9$ in the exemplary situation of FIG. 5, exceeds a predetermined erosion threshold $I_{erosion}$ for at least a predetermined number of days $d_{min}$. The curve 400 may be seen as a connection curve for the minima of the course of the smallest light detection values over time. Said connection curve may be seen as the change of the elements of the series of smallest light detection values and may form the basis for the detection of erosion.

Although the detection of erosion has been described with respect to an at least partially light transmissive cover 8 of the exterior aircraft light 2, the described method may be applied similarly to other optical components of the exterior aircraft light 2, such as lenses 5a and/or reflectors 5b, if erosion of said optical components causes the reflection of additional light onto the light detector 12.

An exemplary method of determining the operating conditions of the exterior aircraft light 2 may comprise the determination of an expectation value $I_{exp}$ for the light detection value, which may also be referred to as an expectation value $I_{exp}$ for the smallest light detection value. For the example of the twelfth day, the expectation value $I_{exp}$ may be the result of extrapolating the connection curve 400 from the ninth day to the twelfth day. The expectation value $I_{exp}$ may be determined by extrapolating the increase from the seventh day to the ninth day or by extrapolating the increase from day 0 to the ninth day or by any other suitable extrapolation method. The expectation value $I_{exp}$ may be seen as representing the light detection due to erosion of the cover 8 only, not taking into account ambient light and not taking into account light detection due to fog and/or clouds.

Reference is now again made to FIG. 4 and to the handling of momentary light detection values during said exemplary twelfth day. The latest detected light detection value $I_{latest}$ is compared to the expectation value $I_{exp}$, which has been determined, in particular extrapolated, from the series of smallest light detection values $I_{min}$ (step 290), as described above with respect to FIG. 5. If the latest detected light detection value $I_{latest}$ exceeds the expectation value $I_{exp}$ by more than a predetermined ambient light detection threshold $I_{amb}$, the presence of ambient light 14 is detected (step 300). In case ambient light has been detected, the operation of the at least one light source 4 may be adjusted. The at least one light source 4 in particular may be dimmed as a function of the amount of detected ambient light 14 (step 310).

In case the ambient temperature $T_{ambient}$, detected by the ambient temperature sensor 15 is below a predefined fog threshold temperature $T_{fog}$, for example $T_{fog}$=25° C. (step 320), the method moves on to determine whether fog and/or clouds 20 may be present in front of the exterior aircraft light 2. In case of fog and/or clouds, a portion of the light, emitted by the exterior aircraft light 2, may be reflected by said fog and/or clouds 20, and the reflected light 18 may glare the pilot(s) of the aircraft 100. It therefore may be beneficial to detect the presence of fog and/or clouds 20 in front of the exterior aircraft light 2 and to adjust the operation of the exterior aircraft light 2 accordingly.

Thus, in case the detected ambient temperature $T_{ambient}$ is below the predefined fog threshold temperature $T_{fog}$, the light detection values I, supplied by the light detector 12, are evaluated for sudden changes and/or fluctuations (step 330).

In case the detected light detection values I increase suddenly, i.e. within a time frame of between 0.5 seconds and 3 seconds, in particular within a time frame of 1 second, by at least 10%, and/or in case the detected light detection values I continuously fluctuate by at least 5% in time frames of between 3 second and 10 seconds, in particular in time frames of 5 seconds, it may be determined that fog and/or clouds 20 are present in front of the exterior aircraft light 2 (step 340).

In this case, the exterior aircraft light 2 is switched into a fog operating mode (step 350), in order to reduce the risk of glaring the pilot of the aircraft 100 by light which is emitted by the exterior aircraft light 2 and reflected by the flog and/or clouds 20 back towards the aircraft 100. Switching into the fog operating mode may include dimming the at least one light source 4 and/or changing the spatial distribution of light 6, emitted by the exterior aircraft light 2, by activating different light sources (not shown) from a plurality of light sources 4 provided within the exterior aircraft light 2.

The light detection values I may be detected periodically, for example at intervals between 0.5 seconds and 30 minutes, in particular in intervals in the range of between 1 second and 5 minutes. The previously discussed method, which is schematically illustrated by the flow chart 200 depicted in FIG. 4, is repeated for every newly detected light detection value I.

In case the detected ambient temperature $T_{amb}$ is below the predefined fog threshold temperature $T_{fog}$, it is beneficial to detect the light detection values I with a frequency f of at least 1 Hz, i.e. to detect at least one new light detection value I every second, in order to allow the detection of fog and/or clouds 20 in front of the exterior aircraft light 2 by identifying fluctuations of the detected light detection values I, as it has been described before.

An example of the change of the light detection values I, caused by fog, is illustrated in the diagram depicted in FIG. 6. In said diagram, the detected light detection values I are plotted on the vertical axis as a function of time t, which is plotted on the horizontal axis.

In a first time frame $t_0<t<t_1$, the detected light detection values remain basically constant at a reference light detection value $I_{ref}$=100%.

At $t=t_1$, however, the detected light detection values I considerably increase up to almost 115% of the reference light detection value $I_{ref}$. In the following time frame $t_1<t<t_2$, the detected light detection values I heavily fluctuate between about 102% and about 112% of the reference light detection value $I_{ref}$. The exemplary time frame between $t_1$ and $t_2$ may be about 30 seconds.

For times $t>t_2$, the detected light detection values I return to values close to the reference light detection value $I_{ref}$.

As described before, from the sudden increase of the reference light detection values I at $t=t_1$ and the heavy fluctuations in the time frame $t_1<t<t_2$, it is determined that fog or clouds 20 are present in front of the exterior aircraft light 2 (cf. FIG. 2A). In consequence, the light output of the exterior aircraft light 2 may be adjusted, in order to reduce the risk of glaring the pilot with light, which is reflected by fog or clouds 20 towards the aircraft 100.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A method of determining operating conditions of an exterior aircraft light comprising at least one light source, wherein the method includes:
    operating the at least one light source of the exterior aircraft light;
    repeatedly detecting light with a light detector, which is located at the exterior aircraft light and configured for providing light detection values (I);
    determining a smallest light detection value ($I_{min}$) provided by the light detector within a first period of time, and storing said smallest light detection value ($I_{min}$) as an element of a series of smallest light detection values ($I_{min}$);
    wherein the method further includes at least one of the following:
    determining a change of the elements of the series of smallest light detection values ($I_{min}$) over a second period of time, which is larger than the first period of time, and detecting erosion of an optical component, in particular a cover, of the exterior aircraft light based on the determined change of the elements of the series of smallest light detection values ($I_{min}$) over the second period of time;
    determining, based on the series of smallest light detection values ($I_{min}$), an expectation value ($I_{exp}$) for the light detection value (I), individually comparing the detected light detection values (I) with said expectation value ($I_{exp}$), and detecting the presence of ambient light if at least one of the detected light detection values (I) exceeds the expectation value ($I_{exp}$) by more than a predetermined ambient light detection threshold; and
    determining a temporal fluctuation of the detected light detection values (I) and detecting the presence of fog and/or clouds in front of the exterior aircraft light if the temporal fluctuation exceeds a predetermined fluctuation threshold.

2. The method according to claim 1,
wherein the first period of time is in the range of 8 hours to 48 hours, wherein the first period of time in particular is 24 hours, and/or
wherein the second period of time includes a plurality of the first periods of time, wherein the second period of time in particular includes 3 to 14, more particularly 5 to 7, of the first periods of time.

3. The method according to claim 1, wherein determining a temporal fluctuation of the detected light detection values (I) includes determining whether the detected light detection values (I) contain a sudden increase, such as an increase of at least 10% within a first time frame of 1 s, and/or whether the detected light detection values (I) contain a continuing fluctuation, such as a change of at least 5% within each of a series of second time frames of 5 s.

4. The method according to claim 1, wherein the method includes determining an ambient temperature ($T_{amb}$) of the exterior aircraft light and further includes executing the steps of determining a temporal fluctuation of the detected light detection values (I) and detecting the presence of fog and/or clouds only if the determined ambient temperature ($T_{amb}$) is below a predetermined temperature threshold ($T_{fog}$), in particular below a predetermined temperature threshold ($T_{fog}$) of 25° C.

5. The method according to claim 1, wherein detecting erosion of the optical component includes relating the elements of the series of smallest light detection values ($I_{min}$) to an initial reference value ($I_0$), wherein the initial reference value ($I_0$) in particular has been determined for an exterior aircraft light comprising an uneroded optical component in a dark environment with neither ambient light nor fog nor clouds being present.

6. The method according to claim 1, wherein the method further includes providing an erosion indication signal if the detected erosion exceeds a predetermined erosion threshold ($I_{erosion}$).

7. The method according to claim 1, wherein the method further includes dimming the at least one light source if the presence of fog, clouds and/or ambient light has been detected.

8. An exterior aircraft light comprising:
at least one light source;
a light detector located at the exterior aircraft light and configured for providing light detection values (I); and
a controller, which is configured for determining the smallest light detection value ($I_{min}$) detected within a first period of time and storing said smallest light detection value ($I_{min}$) as an element of a series of smallest light detection values ($I_{min}$);
wherein the controller is further configured for executing at least one of the following:
determining a change of the elements of the series of smallest light detection values ($I_{min}$) over a second period of time, which is larger than the first period of time, and detecting erosion of an optical component, in particular a cover, of the exterior aircraft light based on the determined change of the elements of the series of smallest light detection values ($I_{min}$) over the second period of time;
determining, based on the series of smallest light detection values ($I_{min}$), an expectation value ($I_{exp}$) for the light detection value (I), individually comparing the detected light detection values (I) with said expectation value ($I_{exp}$), and detecting the presence of ambient light if at least one of the detected light detection values (I) exceeds the expectation value ($I_{exp}$) by more than a predetermined ambient light detection threshold;
determining a temporal fluctuation of the detected light detection values (I) and detecting the presence of fog and/or clouds if the temporal fluctuation exceeds a predetermined fluctuation threshold.

9. The exterior aircraft light according to claim 8, wherein the controller is configured for determining the temporal fluctuation of the detected light detection values (I) by determining whether the detected light detection values (I) contain a sudden increase, such as an increase of at least 10% within a first time frame of 1 s, and/or whether the detected light detection values (I) contain a continuing fluctuation, such as a change of at least 5% within each of a series of second time frames of 5 s.

10. The exterior aircraft light according to claim 8, further comprising an ambient temperature sensor, which is configured for providing a temperature signal indicating an ambient temperature ($T_{amb}$) to the exterior aircraft light, wherein the controller is configured for executing the steps of determining a temporal fluctuation of the detected light detection values (I) and detecting the presence of fog and/or clouds only if the detected ambient temperature ($T_{amb}$) is below a predetermined temperature threshold ($T_{fog}$), in particular below a predetermined temperature threshold ($T_{fog}$) of 25° C.

11. The exterior aircraft light according to claim 8, wherein the controller is further configured for dimming the at least one light source if the presence of ambient light, fog and/or clouds has been detected.

12. An aircraft comprising at least one exterior aircraft light according to claim 8.

13. The method of calibrating an exterior aircraft light according to claim 8, wherein the method comprises:
placing an exterior aircraft light comprising an uneroded optical component, in particular an uneroded cover, in a dark environment with neither ambient light nor fog nor clouds being present;
operating the at least one light source;
detecting light with the light detector and providing an initial reference value ($I_0$); and
storing the initial reference value ($I_0$).

14. The method of calibrating an exterior aircraft light according to claim 13, wherein the method further includes:
placing a white screen in front of the exterior aircraft light;
detecting light, which is reflected by the white screen towards the exterior aircraft light, with the light detector and providing a fog reference light detection value ($I_{fog}$); and
storing the fog reference light detection value ($I_{fog}$).

15. The method of calibrating an exterior aircraft light according to claim 13, wherein the method further includes:
placing a diffuse item, in particular an adhesive tape, in front of a light emission surface of the exterior aircraft light;
detecting light, which is reflected by the diffuse item towards the exterior aircraft light, with the light detector and providing a predetermined erosion threshold ($I_{erosion}$); and
storing the predetermined erosion threshold ($I_{erosion}$).

* * * * *